US011343115B2

(12) United States Patent
Garschhammer et al.

(10) Patent No.: US 11,343,115 B2
(45) Date of Patent: May 24, 2022

(54) CONNECTING A DOMESTIC APPLIANCE TO A REMOTE CONTROL

(71) Applicant: BSH HAUSGERAETE GMBH, Munich (DE)

(72) Inventors: Florian Garschhammer, Tittmoning (DE); Hans Peter Werner, Giengen (DE); Jochen Grimminger, Dillingen (DE); Christopher Rodney, Gundremmingen (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/347,633

(22) PCT Filed: Oct. 20, 2017

(86) PCT No.: PCT/EP2017/076815
§ 371 (c)(1),
(2) Date: May 6, 2019

(87) PCT Pub. No.: WO2018/082936
PCT Pub. Date: May 11, 2018

(65) Prior Publication Data
US 2019/0280888 A1    Sep. 12, 2019

(30) Foreign Application Priority Data

Nov. 4, 2016   (DE) ................. 10 2016 221 614.7

(51) Int. Cl.
*H04L 12/28* (2006.01)
*G08C 17/02* (2006.01)
(Continued)

(52) U.S. Cl.
CPC .......... *H04L 12/2809* (2013.01); *G08C 17/02* (2013.01); *H04M 1/72415* (2021.01);
(Continued)

(58) Field of Classification Search
CPC ......... H04L 12/2809; H04L 2012/2841; H04L 2012/285; G08C 17/02; G08C 2201/93;
(Continued)

(56) References Cited

U.S. PATENT DOCUMENTS 9,769,420 B1 * 9/2017 Moses .................. G08B 25/10
10,075,334 B1 * 9/2018 Kozura ............... H04L 12/2807
(Continued)

FOREIGN PATENT DOCUMENTS

CN      202929466 U     5/2013
CN      203119881 U     8/2013
(Continued)

*Primary Examiner* — Kristie D Shingles
(74) *Attorney, Agent, or Firm* — Laurence A. Greenberg; Werner H. Stemer; Ralph E. Locher

(57) ABSTRACT

A domestic appliance, e.g. a refrigerator, has a switching element and a network interface for connecting the domestic appliance to a local network. The domestic appliance has precisely one switching element, in particular a pushbutton, and can be connected to a remote control via the local network by actuating the switching element. A method is used to operate a domestic appliance which has precisely one switching element and a network interface for connecting the domestic appliance to a local network. The domestic appliance is connected to a remote control via the local network by actuating the switching element.

20 Claims, 2 Drawing Sheets

(51) Int. Cl.
  *H04W 12/06* (2021.01)
  *H04M 1/72415* (2021.01)
  *H04W 84/12* (2009.01)

(52) U.S. Cl.
  CPC ........ *H04W 12/06* (2013.01); *G08C 2201/93* (2013.01); *H04L 2012/285* (2013.01); *H04L 2012/2841* (2013.01); *H04W 84/12* (2013.01)

(58) Field of Classification Search
  CPC .. H04M 1/72533; H04W 12/06; H04W 84/12
  See application file for complete search history.

(56) References Cited

U.S. PATENT DOCUMENTS

| | | | |
|---|---|---|---|
| 10,177,932 | B2 | 1/2019 | Boeldt et al. |
| 10,397,013 | B1* | 8/2019 | Hill ............ H04L 67/306 |
| 2008/0104212 | A1* | 5/2008 | Ebrom ........... H04L 12/2832 709/222 |
| 2010/0222031 | A1* | 9/2010 | Carolan ........... G08C 17/02 455/414.1 |
| 2013/0043986 | A1* | 2/2013 | Pan ............... G08C 17/02 340/12.52 |
| 2013/0065579 | A1* | 3/2013 | Gao ............. H04L 12/2818 455/420 |
| 2015/0039740 | A1* | 2/2015 | Yamada .......... H04L 12/2807 709/223 |
| 2015/0048760 | A1* | 2/2015 | Kwag ............. H05B 45/00 315/297 |
| 2015/0180880 | A1* | 6/2015 | Nakano ........... H04L 63/105 726/4 |
| 2015/0194048 | A1* | 7/2015 | Haubrich ......... G08C 17/02 340/12.5 |
| 2016/0094702 | A1* | 3/2016 | Ariel ............. H04M 1/72415 455/420 |
| 2016/0132030 | A1* | 5/2016 | Marti ............. G05B 15/02 700/275 |
| 2016/0359629 | A1* | 12/2016 | Nadathur ......... H04L 12/2818 |
| 2017/0031337 | A1* | 2/2017 | Jablokov ............ G07C 3/00 |
| 2017/0038087 | A1 | 2/2017 | Nabeshima et al. |
| 2017/0142248 | A1* | 5/2017 | Aytekin ............. H04W 4/20 |
| 2017/0154511 | A1 | 6/2017 | Tang |
| 2019/0013960 | A1* | 1/2019 | Sadwick ........... H05B 47/155 |

FOREIGN PATENT DOCUMENTS

| | | |
|---|---|---|
| CN | 104202224 A | 12/2014 |
| CN | 104469981 A | 3/2015 |
| CN | 105066553 A | 11/2015 |
| CN | 205263523 U | 5/2016 |
| CN | 205319447 U | 6/2016 |
| CN | 105928159 A | 9/2016 |
| CN | 105979571 A | 9/2016 |
| CN | 106059837 A | 10/2016 |
| DE | 102013200374 A1 | 7/2014 |
| EP | 2913906 A1 | 9/2015 |
| EP | 2950289 A1 | 12/2015 |
| EP | 3088810 A1 | 11/2016 |
| EP | 3139546 A1 | 3/2017 |
| WO | 2015039874 A1 | 3/2015 |
| WO | 2016085582 A1 | 6/2016 |

\* cited by examiner

CONNECTING A DOMESTIC APPLIANCE TO A REMOTE CONTROL

BACKGROUND OF THE INVENTION

Field of the Invention

The invention relates to a household appliance having at least one switching element and at least one network interface for connecting the household appliance to a wireless local network. The invention also relates to a method for operating such a household appliance. The invention is particularly advantageously applicable to refrigeration appliances.

WO 2016/085582 A1 discloses a method for setting up a connection of a device with an access point for the first time via radio transmission, using a push-button at the access point. This method comprises receiving a request to join a wireless network at the access point, and receiving a push-button command to couple the device with the access point via radio transmission. The method then prevents a transmission of all "Service Set Identifiers" (SSIDs) allocated to the access point and determines whether the device is permitted to couple with the access point via radio transmission. The access point then sends only one SSID, which is allocated to the device via radio transmission, meaning that erroneous pairings between the access point and the wireless device are prevented.

WO 2015/039874 A1 discloses a method for connecting a household appliance to a wireless home network, which comprises the following steps: receiving access data of the home network by a portable communication terminal; setting up a wireless communication connection, separate from the home network, between the household appliance on the one hand and the portable communication terminal on the other, in accordance with a predefined close-range communication standard; and transmitting control commands from the portable communication terminal to the household appliance via the communication connection, wherein by way of the control commands the household appliance is actuated to connect to the wireless home network using the access data.

EP 2 913 906 A1 discloses a method for the remote control and/or remote monitoring of the operation of a household appliance with the aid of a communication device of a user, wherein the household appliance is connected to a local home network and the communication device communicates with an Internet server, on which a user account of the user is carried, on which data relating to the household appliance is stored, and wherein the remote control and/or remote monitoring of the household appliance takes place by way of the communication device by accessing the data of the user account and with the local home network acting as an intermediary, wherein the Internet server carries a further user account of another user which is separate from the one user account, wherein data relating to one and the same household appliance is stored in both the one and also the other user account, meaning that the remote control and/or remote monitoring of said household appliance is optionally performed by accessing the one or the other user account.

SUMMARY OF THE INVENTION

The object of the present invention is to overcome the disadvantages of the prior art at least partially and in particular to provide a particularly user-friendly, economical and highly visually appealing household appliance, in particular refrigeration appliance.

This object is achieved with the features of the independent claims. Preferred embodiments may be derived in particular from the dependent claims.

The object is achieved by a household appliance, having at least one switching element and at least one network interface for connecting the household appliance to a local network, wherein the household appliance has exactly one switching element and is able to be connected to a remote control via the local network by means of an actuation of the switching element.

Said household appliance has the advantages that it is able to be implemented in a particularly simple and economical manner and additionally enables a front panel which is only visually disturbed to a very limited extent. Furthermore, an incorrect operation by a user is able to be ruled out to a particularly great extent, which increases a user-friendliness. Moreover, a number of requests for customer services of the manufacturer or distributor of the household appliance is thus able to be reduced.

In one embodiment, the household appliance is a refrigeration appliance. The refrigeration appliance may be a refrigerator, a chest freezer, a wine storage cabinet etc. or a combination thereof (e.g. a refrigerator with a separate freezer compartment).

In another embodiment, the switching element is a button, e.g. a sensor button or a short-stroke button. A switching element may also be understood in particular to mean a switching element for controlling the household appliance during operation. An on/off switch for galvanic separation of the household appliance from an electrical supply does not count towards the switching elements in said case. Alternatively, the switching element is the entire mechanical switching element, which is able to be directly actuated by a user, of the household appliance.

A network interface may be built as a module (also able to be referred as a communication module) in the household appliance and e.g. may be connected to a central control unit of the household appliance. The household appliance may also be considered or referred to as an "Internet-enabled household appliance". The network interface may also be referred to as a communication interface.

In another embodiment, at least one network interface is a radio interface. This enables a particularly flexible connection of remote controls to the household appliance. As an alternative or in addition, the household appliance may have a wired network interface, e.g. an Ethernet interface.

In yet another embodiment, the local network is a wireless local network. The wireless local network may be a WLAN ("Wireless Local Area Network") or home network. The wireless local network may be certified according to Wi-Fi or may conform to Wi-Fi. The household appliance may be connected to the wireless local network in a wireless or wired manner.

The household appliance being able to be connected to the remote control via the local network by means of the actuation of the switching element may comprise a connection procedure being able to be initiated by means of the actuation. The connection procedure may proceed with a user prompt or without a user prompt.

In one development, the remote control is a suitably configured user terminal, e.g. a user terminal which is likewise equipped with a network interface and corresponding application software. For example, the user terminal may be a computer (desktop, laptop etc.) or a mobile terminal (smartphone, tablet etc.). The network interface of the user terminal comprises in particular at least one radio interface, e.g. a WLAN interface and/or a Bluetooth interface and/or an NFC interface.

Advantageously, the method is already able to be performed without further provisions when the household appliance is connected to a power supply system.

In another embodiment, the household appliance is without an alphanumeric display. The household appliance being "without an alphanumeric display" comprises the household appliance not having an alphanumeric display, i.e. no display which is able to represent alphanumeric characters. In a development, the household appliance has no alphanumeric display which is able to represent symbols. In particular, a household appliance without an alphanumeric display has no screen constructed in a pixel-type manner (e.g. LCD screen) and no segment display. This embodiment results in the advantage that the household appliance is able to be implemented in a particularly simple and economical manner and additionally enables a front panel which is visually disturbed to a particularly limited extent.

As an alternative, the household appliance may have an alphanumeric display, in particular a screen, in particular a touch-sensitive screen ("touchscreen"). This results in the advantage that displays regarding the connection status of the household appliance are able to be displayed to a user directly. In the event that a touchscreen is present, the switching element may be embodied as a touch-sensitive region of the touchscreen ("touch button"). The presence of a typically pixel-based screen enables the advantage of a particularly informative representation, e.g. also a representation of symbols. The alphanumeric display may, however, also be a segment display, e.g. a seven-segment display. Particularly advantageous in this context is a presence of at least two segment displays, as then typical abbreviations for the connection status (e.g. "Cn" for "Connection", "AC" for "Automatic Connection" or WPS, "SA" for "Software Access Point", etc.) are able to be represented.

In a further embodiment, the switching element is a button and different functions are able to be triggered by means of different actuation patterns of the button. Thus, without limiting a user convenience, it is possible to achieve a wide range of functionality with a single button.

In an embodiment of this, the different actuation patterns comprise different actuation durations. For example, when the button is actuated for a duration]0 s; X s[, a first function is triggered; when the button is actuated for a duration [X s; Y s[, a second function is triggered, etc.

In addition or alternatively, actuation patterns may comprise actuations which take place multiple times in succession (e.g. a double-click). For example, with a simple short actuation of the switching element, an attempt to connect to the local network in accordance with a first type (e.g. using a PBC procedure) may be performed, and with a double-click, the procedure is performed in accordance with a second type (e.g. using a WPS procedure).

In another embodiment, the different functions comprise the establishing of the connection of the household appliance to the remote control and additionally at least one function from the group: inverting an existing type of connection (e.g. connected or disconnected) of the household appliance to the local network and/or resetting at least one network interface of the household appliance. In particular, when the button is actuated for a duration]0 s; X s[, the establishing of the connection of the household appliance to the remote control may be triggered; when the button is actuated for a duration [X s; Y s[, the inversion of the existing type of connection is triggered and, when the button is actuated for a duration [Y s, °°[, the resetting of at least one network interface is triggered. For example, X may amount to 3 s and Y may amount to 10 s.

An inversion of the existing type of connection to the local network may be understood in particular to mean disconnecting a connection from the local network, if such a connection currently exists, and establishing a connection to the local network, if no such connection currently exists. As an alternative, instead of an inversion, simply a disconnection of the connection to the local network may be provided.

In an additional embodiment, the household appliance has at least one indicator beacon or light and the switching element is allocated exactly one light ("status light"), by means of which a connection status of the household appliance is able to be displayed. This makes it easier for a user to check a status of the connection of the household appliance in an economical manner. In one development, the light represents a symbol. In one development, the light is without symbols, i.e. does not represent any symbols. In particular, it may distinguish a light, such that a change in an optical impression which a user is able to experience only results from a change in a brightness of the light emitted by the light, including an on/off sequence, e.g. a flashing at a predefined frequency.

In on embodiment of this, the at least one light has at least one LED as a light source. LEDs are advantageously economical and long-lasting.

In one development, at least the status light is a light which is able to be tuned with regard to its color in terms of its light output. Thus, the color of the light output by the light is used to inform the user. The status light may also flash, in particular at different frequencies, including a permanent lighting.

In another development, a further light is present for displaying the event of an error ("error light"). In one variant, the error light is red.

In another development, the household appliance only has the status light and the error light. This enables a particularly tidy and highly appealing front of the household appliance, as overall only three control elements remain present, which are moreover able to be implemented in a comparatively small and flush manner (namely the switching element, the status light and the error light).

In one development, to supply user information, a speaker is provided, in particular a buzzer, in particular a monotonous buzzer.

In another embodiment, which is particularly advantageous for wireless connection to the local network, in order to connect the household appliance to the remote control, firstly the household appliance is able to be connected to the local network, and then the household appliance is able to be connected to the remote control for the first time (frequently referred to as "pairing") via the local network. The connection procedure is thus divided into two stages or substeps. This enables a connection to the remote control which is reliable and easy to implement.

One possible embodiment of this is that the household appliance is able to be connected to the local network wirelessly via a PBC ("Push Button Configuration") procedure or process. This results in the advantage of a high degree of user-friendliness, as the user does not need to input any network names, passwords or the like. The PBC procedure may take place according to the WPS ("Wi-Fi Protected Setup") method. In one variant, to this end, a corresponding button ("WPS button") at an access point of the local network—for example on a router—has to be pressed within a predefined duration after actuating the switching element.

In one development, the household appliance is configured to set up an in particular wireless connection to the local network (or to an access point thereof) automatically one time after the household appliance has connected to a power supply system. To this end, a suitable duration ("timeout") after the connection may be provided, e.g. of a plurality of minutes. If the connection setup is not successful, it can be attempted once again via an actuation of the switching element.

In an alternative or additional embodiment, for the wireless connection of the household appliance to the local network, the household appliance is able to be connected to the remote control directly wirelessly (i.e. by bypassing the local network), with access data for the local network then being able to be transmitted from the remote control to the household appliance directly (i.e. via the direct wireless connection) and the wireless connection of the household appliance to the local network then being able to be established by means of the received access data. This results in the advantage of a likewise high level of user-friendliness, as a user does not need to proceed towards an access point during this process, for example.

In one development, the household appliance is configured to maintain the direct data connection to the remote control while the connection of the household appliance to the local network is being set up and to transmit a result of the connection setup relating to the local network (e.g. "successful" or "unsuccessful") to the remote control via the direct data connection.

In another development, the household appliance is configured to transmit data identifying the household appliance (e.g. a serial number) to the remote control via the direct data connection. This results in the advantage that, in one variant, the following—in particular first-time—connection of the household appliance to the remote control (pairing) via the local network no longer requires confirmation by the remote control and therefore can proceed automatically.

In another development, the household appliance is configured to set up the direct data connection to the remote control automatically.

In another development, the household appliance is configured to receive data via the direct data connection, in order to trigger at least one function allocated to the switching element. In other words, by way of this received data (e.g. a corresponding command, trigger etc.), at least one function of the switching element can be triggered or carried out by the household appliance, without the switching element having to be actuated manually. This development thus corresponds to a possibility of a "virtual" actuation of the switching element via a device which is connected directly wirelessly. There may be provision for a maximum duration (timeout) between the receiving of corresponding data and the triggering of the function related thereto.

In a further embodiment, the household appliance is able to be directly connected to the remote control by means of the network interface, in particular radio interface, in particular WLAN interface. This results in the advantage that the household appliance can use the same network interface both for the connection to the local network or to the associated access point, as well as for the direct data connection to the remote control. The direct data connection may, for example, be a radio connection and be set up according to what is known as an SAP ("Soft Access Point") process, e.g. in accordance with what is known as the "Wi-Fi direct" standard.

In an alternative or additional embodiment, the household appliance has a wireless close-range radio interface in addition to the network interface for connecting to the local network (e.g. a WLAN interface) and the household appliance is able to be directly connected to the remote control by means of the wireless close-range radio interface. This may make it easier for a user to set up a connection of the household appliance to the local network. The close-range radio interface may be a WPAN ("Wireless Personal Area Network") interface. The close-range radio interface may be a Bluetooth interface, meaning that a Bluetooth data connection between the remote control and the household appliance can be established. The close-range radio interface may be an NFC interface, meaning that an NFC data connection between the remote control and the household appliance can be established. The direct data connection may also be an infrared connection.

The connection of the household appliance to the remote control via the local network (pairing) may take place automatically once the connection of the household appliance to the local network has been set up, or with the interposition of a user prompt (e.g. relating to confirming the connection). The—in particular first-time—connection of the household appliance to the remote control via the local network may also be considered or referred to as "pairing" of household appliance and remote control.

The pairing takes place one time for a given remote control in particular. If this remote control is disconnected from the local network and then connects to the local network once more, the connection between the remote control and the household appliance is re-established automatically.

In another further embodiment, in the case of an already established connection of the household appliance to the local network, the household appliance is able to be immediately connected to a further remote control via the wireless network by means of an actuation of the switching element. In other words, in this embodiment, when the switching element is actuated, a pairing with the further remote control is undertaken directly. This enables a particularly error-free and rapid connection of the household appliance to the further remote control.

In the event that the household appliance is connected to the local network in a wired manner, the household appliance does not need to be connected to the local network (once again) via the actuation of the switching element. The actuation of the switching element, however, continues to be able to be used for pairing with the remote control.

The object is also achieved by a method for operating a household appliance, which has exactly one switching element and at least one network interface for connecting the household appliance to a local network, wherein the household appliance is connected by means of actuating the switching element via the local network. The method may be embodied in an analogous manner to the household appliance and has the same advantages.

The object is further achieved by a method for operating a household appliance, in particular a household appliance as claimed in one of the preceding claims, characterized in that in the method a) a switching element of the household appliance is actuated one time, b) a connection of the household appliance to a local network is then established and c) a connection of the household appliance to a remote control is then established via the local network. The method may be embodied in an analogous manner to the household appliance and has the same advantages.

Thus, in one embodiment the household appliance is connected to the local network via a PBC procedure in terms of data technology in step b).

In another embodiment, in step b) the household appliance is connected to the remote control directly wirelessly in terms of data technology, with access data for the local network then being transmitted from the remote control to the household appliance directly wirelessly and a connection of the household appliance to the local network in terms of data technology is then established by means of the access data. In one development, the direct, wireless connection makes it possible to use the remote control as an extended display of the household appliance and/or as an extended input field, in particular if the remote control has an alphanumeric display, e.g. a touchscreen. In particular, this means that textual and/or graphical information can be displayed and textual information can be input on the remote control.

In one development, the same WLAN interface can be used both for accessing the local network and also as an access point for the direct wireless data connection to the remote control.

Furthermore, in one embodiment, the household appliance is connected to the remote control by means of different data transmission standard (e.g. via Bluetooth or via an IR connection) compared to the connection to the local network (e.g. via WLAN).

Moreover, in one embodiment, the direct wireless connection between the household appliance and the remote control is maintained for at least until the household appliance has transmitted a notification, relating to a successful or unsuccessful establishing of the connection of the household appliance to the local network, to the remote control via said direct wireless connection. Thus, the user can be informed as to the status of the coupling of the household appliance with the local network in a particularly simple and informative manner.

In yet another development, for example, when there is already an established connection of the household appliance to the local network, the household appliance is connected to a further user terminal, in particular a further remote control, via the local network by means of an actuation of the switching element.

The above-described properties, features and advantages of this invention and the manner in which these are achieved will now be described more clearly and intelligibly with an exemplary embodiment, illustrated in the following schematic description of an exemplary embodiment, which will be described in detail making reference to the drawings.

DESCRIPTION OF THE INVENTION

Figure 1:
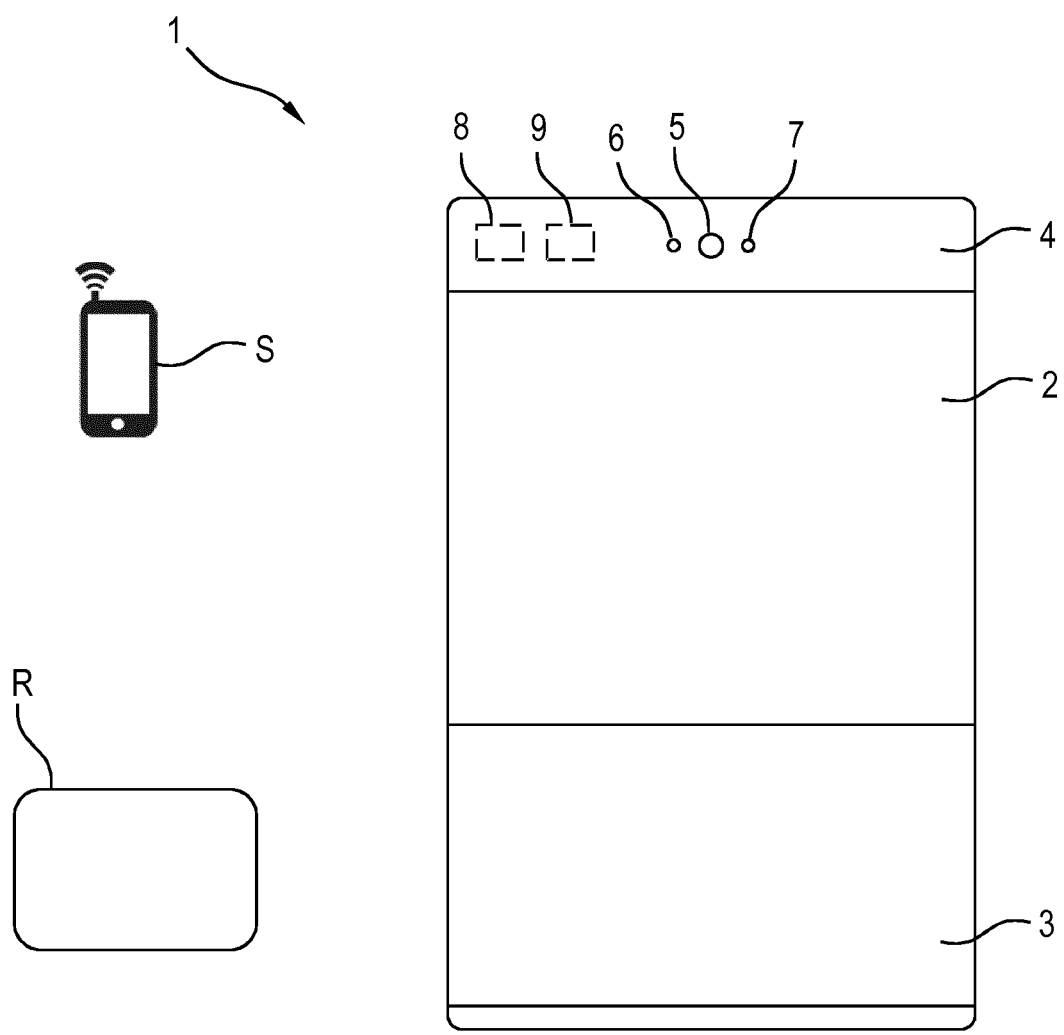
FIG. 1 shows a front view of a schematic diagram of a household appliance.

FIG. 1 shows a refrigeration appliance in the form of a refrigerator 1. The refrigerator 1 has an upper door 2 for closing off a refrigerator compartment (not shown) and a lower door 3 for closing off a freezer compartment (not shown). Above the refrigerator compartment, the refrigerator 1 has a control panel 4. The control panel 4 has only three control elements, namely exactly one switching element in the form of a button 5, one status light 6 and one error light 7. The button 5 may be a sensor button or a short-stroke button. The status light 6 is provided to display a connection status of the refrigerator 1. At least the status light 6 is able to be operated in a flashing manner, in particular also at different frequencies. While the error light 7 is red, the status light 6 can be green for example. The light color of the status light 6 can also be varied in terms of color. The lights 6 and 7 may have LEDs as light sources or may be LEDs.

Furthermore, the radio interface 1 has a WLAN interface in the form of a Wi-Fi module 8 and optionally a close-range radio interface in the form of a Bluetooth module 9.

Here, the refrigerator 1 does not have an alphanumeric display such as an LCD screen, a segment display or the like.

By means of an actuation of the button 5, the refrigerator 1 can be connected to a remote control in the form of a smartphone S via a local home network or home WLAN, indicated here by an access point in the form of a router R. To this end, the smartphone S can be equipped with application software (an "app"), which enables a remote control of the refrigerator compartment 1, e.g. setting a refrigeration temperature of the refrigerator compartment and the freezer compartment.

The refrigerator 1 is embodied such that by means of different actuation durations of the button 5, different functions are able to be triggered, namely when the button 5 is actuated for a duration]0 s; 3 s[, establishing the connection to the smartphone S, when actuating the button 5 for a duration [3 s; 10 s[, inverting the existing type of wireless connection, and when actuating the button 5 for a duration [10 s, °°[, resetting the Wi-Fi module 8 and optionally the Bluetooth module 9, optionally even the entire refrigerator 1 including its central control facility (not shown).

Figure 2:
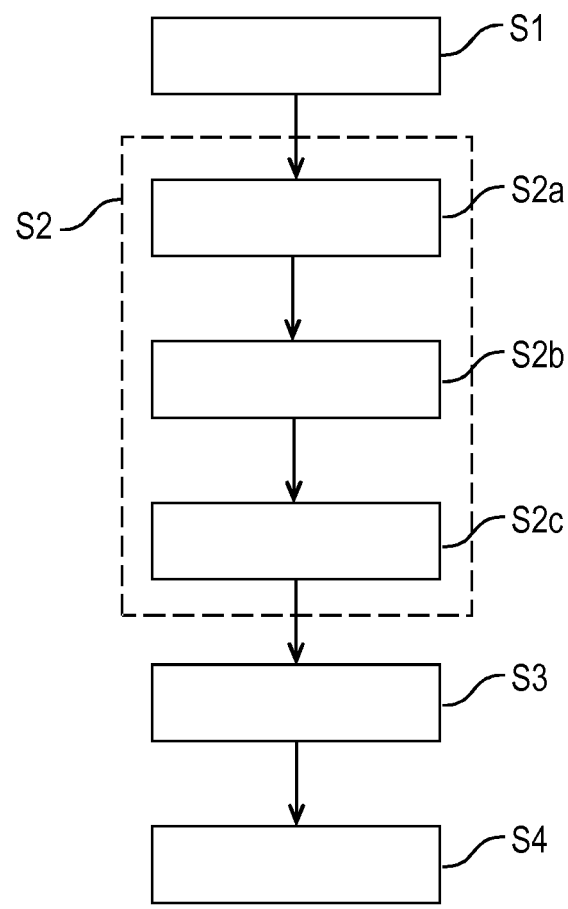
FIG. 2 shows a possible method sequence for connecting the household appliance to a remote control.

FIG. 2 shows a possible method sequence for connecting the refrigerator 1 to the smartphone S.

In a step S1, the refrigerator 1 is connected to a power supply system. The status light 6 is not activated or is dim. The refrigerator 1 has not yet been connected to the router R.

In a second step S2, the refrigerator 1 is connected to the home WLAN.

To this end, in a first substep S2a, a procedure of connecting the refrigerator 1 to the router R is started by a brief pressing of the button 5 of up to three seconds. Firstly, by means of the Wi-Fi module 8 or, if present, by means of the Bluetooth module 9, this causes a data channel to be opened, via which the smartphone S can directly exchange data with the refrigerator 1. In this context, the status light 6 flashes at a frequency of half a Hz. In the event that the direct data connection runs via the Wi-Fi module 8, the Wi-Fi module 8 may then open its own ("refrigerator") WLAN for this purpose.

In a following substep S2b, the smartphone transmits (e.g. by means of a corresponding user prompt) access data (e.g. an SSID and a password) to the refrigerator 1 for access to the home WLAN via the direct data connection. The refrigerator 1 may transmit a serial number or another marking to the smartphone S.

In a following step S2c, the refrigerator 1 attempts to establish a data connection to the router R via the Wi-Fi module 8 by means of the received access data, in order to be incorporated into the associated home WLAN. If this step 2c is successful, the status light 6 flashes at a frequency of one Hz.

The step S2, or the steps S2a to S2c, respectively, in particular may proceed according to what is known as the SAP ("Soft Access Point") process, when only the WLAN module 8 is used or present. Alternatively, step S2 may proceed according to a PBC process in the form of a WPS ("Wi-Fi Protected Setup") process.

If the Bluetooth module 9 is used for the direct data connection between the refrigerator 1 and the smartphone S, the direct data connection can be maintained in step S2c and used, for example, to display a success or failure of the incorporation of the refrigerator 1 into the home WLAN on the smartphone.

In a following step S3, the refrigerator 1 attempts to establish a pairing with the smartphone S via the home WLAN automatically, or after the button 5 is pressed again. If a serial number or the like had been previously transmitted from the refrigerator 1 to the smartphone S, then it is optionally possible to dispense with a confirmation of the pairing by the smartphone S on the part of the user. Otherwise, a user may permit the pairing by the smartphone S via a corresponding user prompt by way of the smartphone S. With the successful performance of the steps S2 and S3, the status light 6 is permanently on. The refrigerator 1 may now be controlled remotely and optionally also monitored by means of the WLAN-enabled smartphone S.

In the event that a further user terminal, e.g. a further smartphone or other mobile terminal (not shown), is to be connected to the refrigerator 1, then in a further step S4—with an existing Wi-Fi connection to the home WLAN or to the router R—the button 5 may be briefly pressed again for up to three seconds. A pairing procedure then takes place analogously to step S3 for performing the pairing with the further user terminal, e.g. for up to two minutes. During this re-pairing, the status light 6 may, for example, flash again at a frequency of half a Hz. The further user terminal may likewise be embodied or provided as a remote control.

If the button 5 is pressed for a medium length of time of between three seconds and ten seconds, the data connection to the home WLAN is inverted. This means that an existing data connection to the home WLAN is disconnected. When the data connection is disconnected, the status light 6 is switched off. If the button 5 is actuated once more for a medium length of time, the data connection to the home WLAN or the router R is set up again.

If the button 5 is pressed for a long time (i.e. ten seconds or more), then this causes the Wi-Fi module 8 and—if present—the Bluetooth module 9 to be reset to their factory settings. These may correspond to a status according to step S1.

Naturally, the present invention is not restricted to the exemplary embodiment disclosed.

In general, "a", "an", etc. can be understood as singular or plural, in particular in the sense of "at least one" or "one or more", etc., provided this is not explicitly excluded, e.g. by the expression "exactly one", etc.

A numerical value can also include the given value as a typical tolerance range, provided this is not explicitly excluded.

LIST OF REFERENCE CHARACTERS

1 refrigerator
2 upper door
3 lower door
4 control panel
5 button
6 status light
7 error light
8 Wi-Fi module
9 Bluetooth module
R router
S smartphone
S1-S4 method steps
S1a-S1c substeps of method step S2

The invention claimed is:

1. A household appliance, comprising:
at least one network interface for connecting the household appliance to a local network; and
exactly one switching element;
wherein the household appliance is able to connect to a remote control via the local network by means of an actuation of said switching element, wherein said switching element is a button and different functions are able to be triggered by means of different actuation patterns of said button, wherein the different functions include at least establishing a connection of the household appliance to the remote control, inverting an existing type of wireless connection of the household appliance to the local network, and resetting said at least one network interface of the household appliance; and
wherein the inverting of the existing type of wireless connection of the household appliance to the local network requires separating a wireless connection between the household appliance and the local network when such a connection currently exists and establishing a wireless connection with the local network when no such connection currently exists, and wherein the inverting of the existing type of wireless connection of the household appliance to the local network is performed in response to an actuation of the button for a period of 3 to 10 seconds.

2. The household appliance according to claim 1, wherein the household appliance is without an alphanumeric display.

3. The household appliance according to claim 1, wherein the different actuation patterns have different actuation durations.

4. The household appliance according to claim 1, further comprising at least one light and said button is allocated said light, by means of which a connection status of the household appliance is able to be displayed.

5. The household appliance according to claim 4, wherein said light has at least one light emitting diode as a light source and is able to be tuned with regard to its color.

6. The household appliance according to claim 1, wherein first the household appliance is able to be connected to the local network, and then the household appliance is able to be connected to the remote control via the local network.

7. The household appliance according to claim 6, wherein the household appliance is able to be connected to the local network via a push button configuration procedure.

8. The household appliance according to claim 6, wherein in order to connect the household appliance to the local network, the household appliance is able to be connected to the remote control directly wirelessly, access data for the local network is then able to be transmitted from the remote control to the household appliance directly and a wireless connection of the household appliance to the local network is then able to be established by means of the access data.

9. The household appliance according to claim 8, wherein said network interface is a wireless local area network interface and the household appliance is able to be directly connected to the remote control by means of said WLAN interface.

10. The household appliance according to claim 8, further comprising a wireless close-range radio interface and the household appliance is able to be directly connected to the remote control by means of said wireless close-range radio interface.

11. The household appliance according to claim 1, wherein in a case of an already established connection of the household appliance to the local network, the household appliance is able to be connected to a further user terminal via the local network by means of an actuation of said button.

12. The household appliance according to claim 1, wherein:
the household appliance is a refrigeration appliance; and
said at least one network interface is a radio interface.

13. The household appliance according to claim 12, wherein said further user terminal is a further remote control.

14. The household appliance according to claim 1, wherein said switching element is disposed on the household appliance.

15. A method for operating a household appliance, which comprises the steps of:
actuating a switching element of the household appliance one time to thereby establish a connection of the household appliance to a local network wherein the switching element is a button;
triggering different functions by means of different actuation patterns of the button, the different functions including at least inverting an existing type of wireless connection of the household appliance to the local network, and resetting at least one network interface of the household appliance, wherein the inverting of the existing type of wireless connection of the household appliance to the local network requires separating a wireless connection between the household appliance and the local network when such a connection currently exists and establishing a wireless connection with the local network when no such connection currently exists, and wherein the inverting of the existing type of wireless connection of the household appliance to the local network is performed in response to an actuation of the button for a period of 3 to 10 seconds; and
establishing a connection of the household appliance to a remote control via the local network.

16. The method according to claim 15, which further comprises connecting the household appliance to the local network via a push button configuration procedure.

17. The method according to claim 15, which further comprises:
connecting the household appliance to the remote control directly wirelessly;
transmitting access data for the local network from the remote control to the household appliance directly wirelessly; and
establishing a connection of the household appliance to the local network by means of the access data.

18. The method according to claim 17, which further comprises connecting the household appliance to the remote control by means of a different data transmission standard compared to the connection to the local network.

19. The method according to claim 17, which further comprises maintaining a direct wireless connection between the household appliance and the remote control for at least until the household appliance has transmitted a notification, relating to a successful or unsuccessful establishing of the connection of the household appliance to the local network, to the remote control via the direct wireless connection.

20. The method according to claim 15, wherein the switching element is disposed on the household appliance.

* * * * *